United States Patent [19]

O'Brien

[11] Patent Number: 4,688,044
[45] Date of Patent: Aug. 18, 1987

[54] MULTIPLE RANGE INTERVAL CLUTTER CANCELLATION CIRCUIT

[75] Inventor: Edwin L. O'Brien, Fullerton, Calif.

[73] Assignee: Hughes Aircraft Company, Los Angeles, Calif.

[21] Appl. No.: 882,582

[22] Filed: Jul. 7, 1986

[51] Int. Cl.⁴ .............................................. G01S 13/52
[52] U.S. Cl. ..................................... 342/160; 342/159
[58] Field of Search ............... 342/159, 160, 161, 162, 342/163, 164

[56] References Cited

U.S. PATENT DOCUMENTS

| | | | |
|---|---|---|---|
| 3,879,729 | 4/1975 | Nevin | 343/7 A |
| 4,003,052 | 1/1977 | Adelman et al. | 343/7.7 |
| 4,035,799 | 7/1977 | Hsiao | 343/7.7 |
| 4,042,924 | 8/1977 | Evans et al. | 343/7 A |
| 4,086,592 | 4/1978 | Lewis et al. | 343/100 |
| 4,119,962 | 10/1978 | Lewis | 343/7.7 |
| 4,137,532 | 1/1979 | Taylor et al. | 343/7.7 |
| 4,318,099 | 3/1982 | Hsiao | 343/5 SW |
| 4,390,881 | 6/1983 | Lewis et al. | 343/100 |
| 4,450,448 | 5/1984 | Albanese et al. | 343/379 |
| 4,489,320 | 12/1984 | Lewis et al. | 343/7.7 |
| 4,496,949 | 1/1985 | Giuliano et al. | 343/7.7 |

*Primary Examiner*—Thomas H. Tarcza
*Assistant Examiner*—Donald E. Hayes, Jr.
*Attorney, Agent, or Firm*—Thomas A. Runk; Anthony W. Karambelas

[57] ABSTRACT

A multiple range interval clutter cancellation circuit for MTI radars is disclosed, for assuring cancellation of narrow band clutter in the second or further range interval, while preserving wideband cancellation in the nearer range intervals and economizing on the number of fill pulses. The circuit includes two clutter cancellers. One canceller has a relatively narrow band clutter rejection bandwidth, and effectively a higher number of fill pulses in relation to the clutter rejection bandwidth and effective number of fill pulses for the second canceller. The outputs of the two cancellers are subjected to an AND gate function, such that only targets which pass through the clutter rejection bandwidth of both cancellers are reported as a target. The circuit obtains the elimination of returns from ambiguous range interval clutter with less transmitted energy and time than conventional canceller circuits.

9 Claims, 13 Drawing Figures

MULTIPLE RANGE INTERVAL CLUTTER CANCELLATION CIRCUIT

BACKGROUND OF THE INVENTION

The present invention relates to Moving Target Indicator (MTI) radar systems employing limited transmitted pulse trains or burst waveforms to form single or multiple filters, and more particularly to a circuit for such radars which cancels returns from ambiguous range clutter with less transmitted energy and less time than that required by conventional systems.

MTI radar systems are well known in the art, and have received considerable discussion in the literature. One exemplary general description of MTI radars appears in the book "Introduction to Radar Systems," by Merrill I. Skolnick, McGraw-Hill Book Company, 1980, at Chapter Four. Since the Doppler return from stationary targets have unchanging return amplitudes and range from pulse to pulse, delay-line cancellers are conventionally employed as filters to remove the d-c (unchanging) components of fixed targets and to pass the a-c (changing) components of moving targets. The i-f signal from the receiver (or alternatively a baseband inphase and quadrature representation) is divided between two channels, one a normal i-f channel and the other including a delay line providing a delay equivalent to the inter-pulse-period to the i-f signal. The outputs from the respective channels are then coherently subtracted from one another, and the resultant signal includes only returns from moving targets, since the returns from fixed targets have non-varying phases and amplitudes from pulse to pulse, and are cancelled. This type of processor is known as a single canceller.

To achieve a desired frequency domain performance from the delay-line canceller to cancel particular kinds of clutter, various arrangements including multiple delay lines have been employed. One common configuration, the double canceller, employs two cascaded single canceller circuits, which is equivalent to combining the signal from the present pulse period, the signal from the preceding pulse period with its amplitude weighted by $-2$, and the signal from two pulse periods previous.

The present invention is concerned with the detection of moving targets by MTI active radars, which process the returns from a plurality of pulses comprising a limited pulse train transmitted at a fixed pulse-repetition-rate (PRF), defining a fixed inter-pulse-period (IPP). The length (in time) of the IPP for a given radar is related to the unambiguous range interval, the maximum target range at which a transmitted pulse may propagate to the target and the target return be reflected back to the radar before the next pulse is transmitted. The unambiguous range interval may be considered the "first range interval." The target (or a stationary object producing clutter returns) could be at a range which is outside that defined by the unambiguous or first range interval such that the return from the target is received in the second IPP following the transmitted pulse. This second IPP following a particular pulse is considered the "second range interval." If the target or stationary object is further away from the radar such that the return is received in the third IPP following a transmitted pulse, then the return is considered to be in the "third range interval." The second and third (or further) range intervals are considered to be ambiguous intervals.

The number of pulses required for MTI operation is a function of the number of returns processed and the number of range intervals over which the processor must be effective in clutter cancellation. The number of processed returns determines the frequency response of the canceller, e.g., the breadth of the clutter rejection null formed by the canceller. Typically the fewer number of returns which are processed, the narrower is the clutter rejection null, centered at zero doppler frequency (stationary object). For many applications, it is desirable to broaden the clutter rejection null, e.g., to cancel returns from slowly moving objects not considered "targets," or to increase the degrees of freedom in tailoring the filter response so as to provide a desired filter characteristic, e.g., sharp filter skirts. To broaden the null or to increase the allowable degrees of freedom, the returns from more transmitted pulses are processed, e.g., as described above with respect to the single and double cancellers.

The number of range intervals over which the processor must be effective in clutter rejection also affects the required number of transmitted pulses. Enough pulses must be transmitted to provide the returns required for the processor operation over the number of range intervals over which effective clutter cancellation is required. The pulses required to be transmitted to meet the range interval clutter cancellation requirements but which are not used in a given processing interval in the processor are known as "fill" pulses. For example, if four pulses are transmitted and the returns from three pulses are processed in a double canceller MTI radar processor, then one pulse is a fill pulse, and the canceller is capable of cancelling clutter in the first and second range intervals. In a conventional MTI system, enough fill pulses are typically transmitted to assure cancellation of clutter at the longest range.

The disadvantages of the use of fill pulses are the required additional time and transmit energy. For pencil beam radars, there is often not enough time to use extra fill pulses and still be able to fill the scan volume with pencil beams in the time allotted. Thus, unless other steps are taken, the MTI processor output will include uncancelled returns from ambiguous range clutter.

It would therefore represent an advance in the art to provide a processor that eliminates returns from ambiguous range clutter with less transmitted energy and time than conventional MTI radar processors.

SUMMARY OF THE INVENTION

The invention comprises an MTI radar detection processor adapted to cancel clutter in the second or further range intervals with fewer fill pulses. In accordance with the invention, an MTI processor is disclosed which employs two (or more) different MTI cancellers. The number of pulses transmitted is determined by the number required for the canceller having the broadest clutter cancellation bandwidth (or the greatest number of degrees of freedom in tailoring the clutter rejection response) to cancel clutter from objects within the first range interval. The canceller with fewer delay loops has effectively more fill pulses, but also a narrower band clutter rejection bandwidth (or fewer degrees of freedom). A logical "AND" function is performed on the outputs of the two (or more) MTI cancellers. Thus, only return signals which are provided as an output from both cancellers are ultimately detected as targets.

Wideband clutter in the early range intervals where the fill pulses are active for both cancellers is rejected, as well as narrow band clutter in the second or further range intervals which is within the notch of the second canceller which effectively has more fill pulses. Targets with a Doppler frequency outside the wide clutter notch continue to be detected. The invention is particularly useful to eliminate returns from land clutter caused by superrefraction (ducting).

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 5 is a simplified block diagram of an MTI radar system employing two filter sets in accordance with the invention.

DETAILED DESCRIPTION OF THE PREFERRED EMBODIMENT

Figure 1:
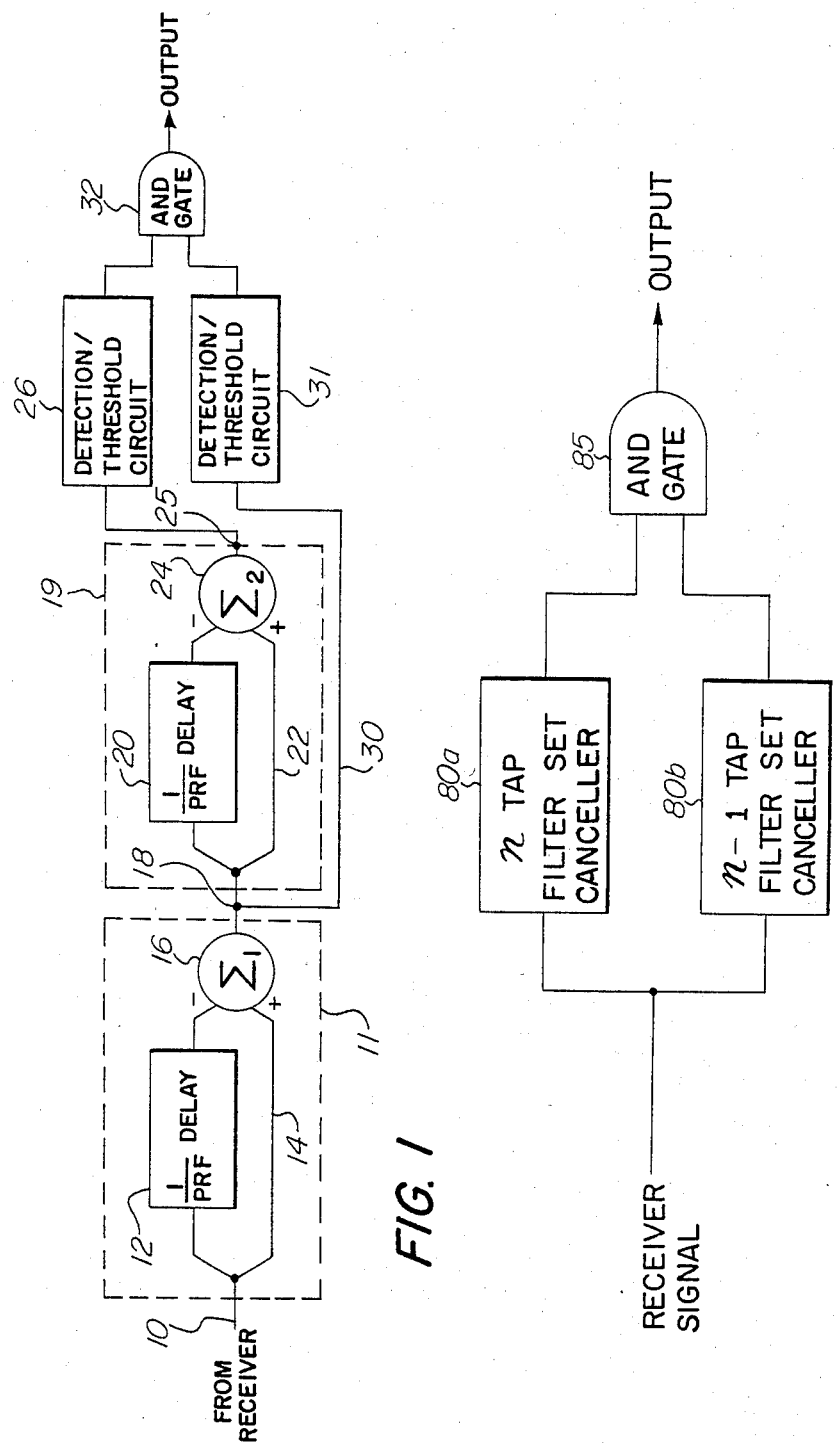
FIG. 1 is a schematic depiction of a preferred embodiment of the invention.

FIG. 1 illustrates an embodiment of a processor circuit embodying the invention, comprising a first single canceller circuit 11 and a cascaded second single canceller circuit 19.

The radar return signals 10 from the radar receiver (not shown) are divided into two channels comprising the first single canceller circuit 12. The two channel outputs are weighted and combined at summing device 16. One channel includes delay line 12, which provides a time delay equal to the inter-pulse period which is the inverse of the pulse repetition frequency, the "PRF" (1/PRF). The delayed channel output is inverted and summed with the non-delayed channel output from line 14. The output of summing device 16 at node 18 comprises the single canceller output.

The first single canceller output is provided to the circuit 19, which is a replication of circuit 11. Thus, circuit 19 includes two channels, one including the 1/PRF delay line 20, and the other comprising line 30 and the summing device 24. The output of the delay line channel is inverted and combined with the non-delayed channel 22 output by summing device 24. The output of the cascaded single canceller 19 appears at node 25. This cascaded configuration is conventionally known as a double canceller circuit, and thus the double canceller output is taken at node 25.

The respective outputs of the single and double cancellers are processed by respective detection and threshold circuits 26 and 31. These circuits test the canceller output against a threshold to provide a target signal indication only when the threshold is crossed. Thus, the output of the circuits 26 and 31 reflect either the "no target detected" condition or the "target detected" condition. These circuits are well known to those skilled in the art; one such circuit is described in U.S. Pat. No. 4,042,924, by Evan et al. and entitled "MTI Clutter Tracking and Cancelling System."

It is well known that the double canceller has a broad clutter-rejection null in the vicinity of d-c than the single canceller, but requires three transmitted pulses to process over a given range interval to achieve the broader rejection null; i.e., the returns from the current interval and the preceding two intervals are processed to provide the canceller output. The single canceller, while having a narrower clutter-rejection null than the double canceller, requires only two pulses to process over a given range interval; i.e., the returns from the present interval and the immediately preceding interval are processed to provide the single canceller output. Thus, if three pulses are available, the single canceller is capable of cancelling second range interval clutter, while the double canceller is not. For the double processor to provide clutter rejection capability in the second range interval, an additional (fourth) pulse must be transmitted.

In accordance with the invention, the outputs from the respective threshold circuits 26 and 31 are coupled to the AND gate circuit 32, which performs the logical "AND" function on the respective threshold circuit signals. Only when both threshold circuit outputs indicate a target will the AND gate 32 report a target signal output. Thus, only signals which are processed and provided as a "target detected" output by both cancellers are ultimately detected. Wideband clutter in the early range intervals where the fill pulses are active for both cancellers is rejected, as is narrow band clutter which is within the clutter rejection notch of the single canceller which effectively has more fill pulses. Targets whose doppler return is outside the wide clutter notch are passed by both cancellers and hence continue to be detected.

Figure 2:
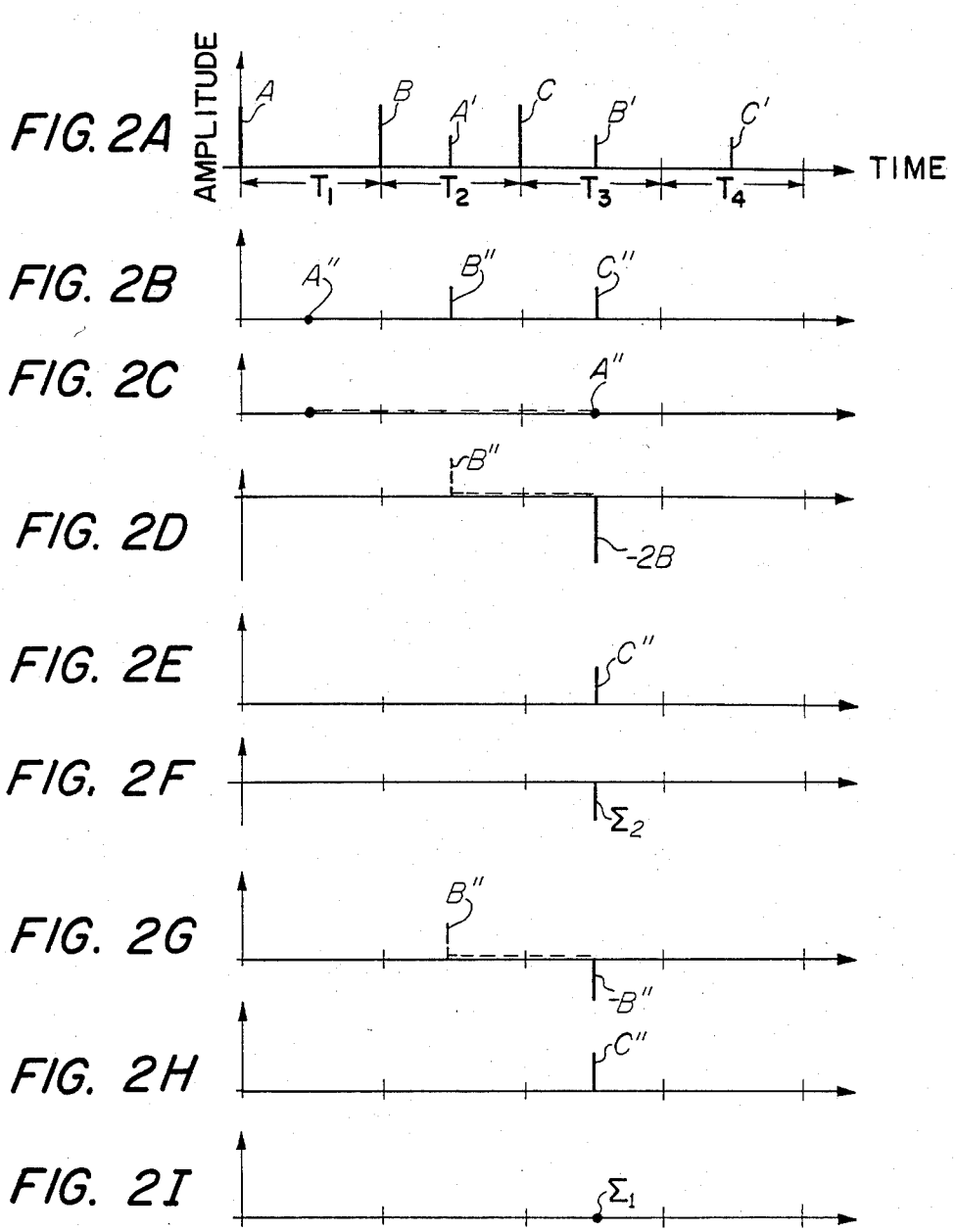
FIG. 2A-I are plots of various radar return signals, illustrating the operation of the circuit of FIG. 1.

FIGS. 2A-2I are pictorial illustrations of the operation of the circuit of FIG. 1 for three transmitted pulses A, B and C. The transmitted pulses A, B and C are depicted in FIG. 2A, separated in time by the inter-pulse period which defines the length of the respective time intervals $T_1$-$T_4$ shown in FIG. 2A. Thus, each interval $T_1$-$T_4$ is 1/PRF seconds in duration. The processor of FIG. 1 provides useful output signals only during the time interval $T_3$ following the last transmitted pulse (C). For this example, it is assumed that only clutter returns from stationary targets are received. Thus, A', B' and C' (FIG. 2A) depict the actual clutter returns (which happen to be from the respective second range intervals in relation to the respective transmitted pulses). FIG. 2B depicts the apparent clutter returns from the first range interval, A", B" and C". There is no apparent first interval return from the first transmitted pulse A(A"=0). However, as indicated, the apparent first interval returns B" and C" are non-zero.

For purposes of this example, the time interval to be processed is $T_3$. FIGS. 2C-2E represent the signals processed by the double canceller of FIG. 1. FIG. 2C indicates that the apparent first interval return A" is delayed by the duration of two intervals, 2/PRF, representing the single signal path through the circuit of FIG. 1 which is through both delay lines 12 and 20 (with double inversion). Because A"=0, then A" twice delayed is also zero. FIG. 2D indicates that the apparent first interval return B" is weighted by a factor of −2, representing the two paths through the circuit of FIG. 1 through only one delay line 12 or 20 (with inversion). The apparent first interval return C" is depicted in FIG. 2E, representing the single undelayed path through the circuit of FIG. 1 (along lines 14 and 30).

The summation of the three signals of FIGS. 2C–E represents the summation at device 24, the output of the double canceller, and is non-zero, representing $-2B''+C''$, shown in FIG. 2F. The double canceller output is then processed by the detection and threshold circuit 26, to provide a "high" signal, erroneously representing the "target detected" state.

The output of the single canceller is represented by the sum of the signals depicted in FIGS. 2G–I. Thus, the return B'' is shown in FIG. 2G as delayed by 1/PRF and inverted, representing the single delay path through delay line 14 of FIG. 1. FIG. 2H represents the return C'' processed through the non-delayed channel of the single canceller. The sum of $-B''$ and $C''$ provide a zero output of the single canceller, indicated in FIG. 2I.

The outputs of the respective detection threshold circuits 26 and 31 are coupled to the input of AND gate circuit 32, which performs the conventional AND logic function on the input signals, i.e., the output of the gate 32 will be at the "high" state if and only if both input signals are at the "high" state. The "high" state output of the double canceller detection and threshold circuit 26 for this example is "ANDed" with the "low" state output of the single canceller detection and threshold circuit 31 for this example, providing a "low" state processor output, correctly indicating the "no target detected" state. This is the desired result since it was assumed for this example that only stationary clutter is being received, and the object of the circuit is to reject such clutter.

The advantages of the invention are apparent from comparison with a conventional double canceller MTI radar. In order for such a canceller to be capable of cancelling clutter in the first and second range intervals, four pulses are transmitted and the returns from three pulses are processed by the MTI radar with one pulse being a fill pulse. The invention allows the capability of cancelling relatively wideband clutter in the first range interval by the double canceller MTI circuit while utilizing only three transmitted pulses, and while simultaneously cancelling clutter in the first and second range intervals with a single canceller MTI.

The "ANDing" of the outputs of the detection and threshold circuits for the two cancellers assures that clutter rejected by the relatively narrow clutter null of the single canceller will not appear at the circuit output, while simultaneously assuring that broader band clutter in the first range interval which is rejected by the broader notch of the double canceller will also not appear at the circuit output. Targets not in either notch will pass both cancellers and are detected. Thus, an MTI processor using three transmitted pulses is provided by the invention which will cancel second range narrowband clutter (which the double canceller alone will not do), and simultaneously preserve a wideband notch in the first range interval (which the single canceller alone will not do).

Figure 3:
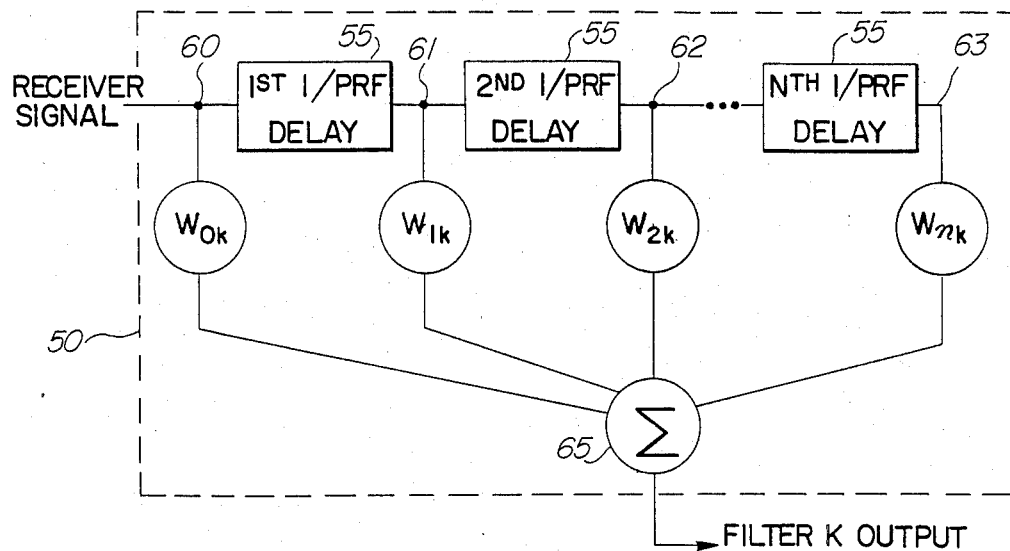
FIG. 3 is a simplified schematic diagram of a generalized tapped delay line transversal filter such as may be used in an MTI radar employing the invention.

The system depicted in FIG. 1 employs well-known simple MTI canceller circuits, the single canceller and the double canceller. MTI cancellers may be generally characterized as comprising one or more transversal filters. As will be apparent to those skilled in the art, the filter 50 shown in FIG. 3 is a transversal filter generalization of an MTI filter such as may be formed by the circuits 11 or 19 of FIG. 1. The filter 50 comprises n cascaded delay devices 55, each for providing a time delay equal to 1/PRF. The various delayed and undelayed signals at the respective taps or nodes 60–63 are weighted by weights $W_{ik}$ and then summed at summing device 65 to provide the filter output. The tap weights depicted as $W_{ik}$ are complex and refer to the tap weight for the "ith" tap and the "kth" filter, where i is an integer ranging from zero to n.

Figure 4:
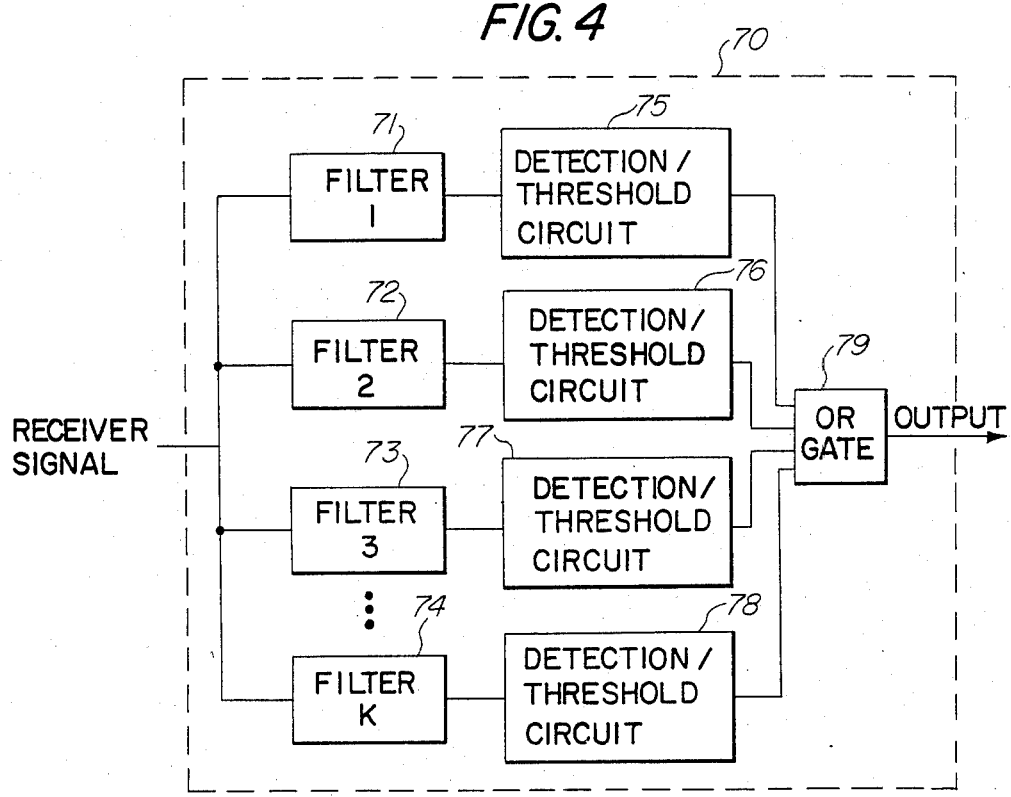
FIG. 4 is a simplified block diagram of an MTI radar employing one filter set.

The invention may also be employed with range-gated pulse doppler (RTPD) MTI systems, wherein the time (corresponding to range) between two successive pulses is divided into small time (range) sub-intervals, corresponding to range cells. In many MTI radars including typical RGPD radar systems, a number of the filters shown in FIG. 3 are normally employed, with each filter being arranged to pass the radar return signals in a particular doppler region. The range cells are examined in succession as the corresponding canceller output signals are generated by the canceller circuit. Filters which may contain only clutter returns (i.e., zero doppler frequencies) are typically excluded from the conventional arrangement. Each filter has at its output a detector and threshold circuit to detect the presence of a target signal within that filter. The outputs of the detector threshold circuits are then processed through a logical "OR" gate function for the purpose of detecting a target. This type of arrangement is illustrated in FIG. 4. Thus, the respective filters 71–74 are coupled to the corresponding detection and threshold circuits 75–78, with the outputs of the circuits 75–78 being coupled to the input of the OR gate 79. The circuit enclosed by phantom line 70 may be generally referred to as a clutter canceller comprising a filter set. In order to reject clutter returns, the same clutter signal must appear at all taps of the transversal filter. Therefore, to cancel second range interval clutter in an "n" tap system, $n+1$ pulses must be transmitted and the return signals from the last n intervals are processed.

It will be appreciated by those skilled in the art that in the time domain, the output of the filters 71–74 will be a time varying signal corresponding to range within the particular doppler filter bandwidth. Thus, the filter output may be sampled to provide one or more samples within each range cell. In a digital implementation, the samples may be stored in memory for recall for further processing in the event that a target is detected. Such further processing could include interpolation between doppler filters to determine the target speed and interpolation of the target return data between range cells to provide an accurate estimate of the target range. Signal amplitudes may also be recovered. Techniques for such further processing are well known to those skilled in the art.

In a generalized MTI radar embodying the invention, two sets of filters are employed to process the returns from n transmitted pulses. One set of filters is obtained by combining the weighted signals derived from n taps of the general filter illustrated in FIG. 3, and the second set of filters is obtained by combining the weighted signals from the first $n-1$ taps of the filter.

In the case of simple MTI canceller circuits such as the conventional single and double cancellers described with respect to FIG. 1, it is appropriate to describe the respective clutter rejection null responses or bandwidths as being relatively narrow band or broader band. For the generalized MTI processor characterized by a multi-tap transversal filter, the number of taps of the filter which are processed determines the degrees of freedom available to tailor the filter response to achieve a desired characteristic. In a particular application, for example, n taps might be processed to provide a null response characterized by sharp skirts. In another application, the n taps may be processed to place multiple zeros at the clutter position to obtain a broadened clutter null (at the expense of skirt sharpness).

If only n−1 taps are processed, the number of degrees of freedom available to tailor the filter response is reduced. In some applications, this may result in the clutter null response being narrower than for the n tap case. These concepts of filter design and construction are well known to those skilled in the art.

Because the set of filters derived from n taps would require the returns from n+1 transmitted pulses to provide cancellation of second range interval clutter, such clutter will not be rejected by the filter set employing all n taps to process the return from n transmitted pulses. The filter set employing only n−1 taps requires n transmitted pulses to cancel second range interval clutter and, hence, will reject such clutter. Processing the outputs of the two filter sets by an AND gate function utilizes the superior filtering properties of the n tap filter set for first interval clutter while suppressing returns from narrowband second interval clutter which do not appear at the output of the n−1 filter set.

FIG. 5 is a simplified block diagram of a generalized MTI radar processor employing the invention. A first canceller circuit 80a comprises a first set of doppler filters, each derived from n taps of the general transversal filter of FIG. 3, and generally represents a canceller circuit as depicted in FIG. 4, including the corresponding detection and threshold circuits and the OR gate. Similarly, a second canceller circuit 80b generally represents a canceller circuit as depicted in FIG. 4, but with each filter derived from the first n−1 taps of the general transversal filter of FIG. 3. The respective outputs of each filter set canceller are then coupled as inputs to AND gate 85. In operation, the processor of FIG. 5 provides output signals only during the interpulse time interval following the nth transmitted pulse.

A multiple range interval clutter cancellation circuit has been disclosed. The embodiments of FIGS. 1 and 5 have been directed to providing the capability of cancelling second range clutter. However, the technique may be extended further, e.g., employing an n−2 tap filter set with an n tap filter set to suppress second and third range interval clutter. Thus, in general, the invention may be employed to process the returns from n transmitted pulses to provide a capability of providing clutter rejection capability for the first through m+1 range intervals, where n and m are both integer values, and m is less than n. Moreover, in some applications it may be advantageous to employ more than two filter sets, wherein the outputs from all the filter sets are ANDed together.

it is to be understood that the embodiments described with respect to FIGS. 1-5 are preferably implemented with digital devices to provide the functions of the various devices comprising the radar processor. For example, it may be advantageous in certain applications to employ shift registers as the delay devices. The particular implementation details of the filter set cancellers per se are known to those skilled in the art.

It is understood that the above-described embodiments are merely illustrative of the possible specific embodiments which may represent principles of the present invention. Other arrangements may be devised in accordance with these principles by those skilled in the art without departing from the scope of the invention.

What is claimed:

1. A Moving Target Indicator (MTI) radar processor for processing the radar return signals resulting from n radar pulses transmitted at a constant pulse repetition rate (PRF) to detect moving targets while rejecting clutter in a second range interval; comprising:

a first clutter canceller circuit arranged to process radar return signals received during the n interpulse-period (IPP) intervals following the first pulse and to provide a first canceller output signal during the nth such interval;

a second clutter canceller circuit arranged to process radar return signals received during said nth interval and the n−2 immediately preceding intervals and to provide a second canceller output signal during said nth IPP interval;

whereby the first and second canceller circuits provide respective clutter rejection null responses, with the first canceller circuit having increased degrees of freedom for the tailoring of the respective null response in relation to the null response of the second canceller circuit; and an output processor for processing said first and second canceller circuit output signals and reporting as moving targets only those targets which pass through the clutter rejection nulls of both the first and second canceller circuits, whereby said processor provides the capability of the clutter rejection null response of the first canceller circuit in the first range interval and the capability of the clutter rejection null response of the second canceller circuit in the second range interval.

2. The radar processor of claim 1 wherein said first and second canceller output signals comprise binary-level signals wherein a low state is indicative of the "no target detected" condition and a high state is indicative of the "target detected" condition, and wherein said output processor comprises an AND gate device for performing a logical AND function on said first and second canceller output signals, thereby providing a high output signal indicative of the "target detected" condition if and only if both canceller output signals are at said high state.

3. The radar processor of claim 2 wherein said first canceller circuit comprises a double canceller circuit having a relatively broad clutter rejection null response and said second canceller circuit comprises a single canceller circuit having a relatively narrow clutter rejection null response, and wherein the processor provides the capability of the relatively broad band clutter rejection null of the first canceller circuit in the first range interval and the capability of the narrower band clutter rejection null of the second canceller circuit in the second range interval.

4. A Moving Target Indicator (MTI) radar processor for processing radar return signals from radar pulses transmitted at a fixed pulse repetition frequency (PRF), comprising:

a first MTI clutter canceller circuit requiring n transmitted pulses to provide a first clutter rejection bandwidth over the first range interval and arranged to provide a first MTI circuit output indicative of a particular target detection condition, including the "no target detected" and "target detected" conditions, during the 1/PRF interval following the nth transmitted pulse;

a second MTI clutter canceller circuit requiring n-m transmitted pulses to provide a second clutter rejection bandwidth over the first through the (m+1)th range intervals and arranged to provide a second MTI circuit output indicative of a particular target detection condition, including the "no target detected" and "target detected" conditions; and means for performing a logical "AND" function on said first and second MTI circuit outputs and providing a processor output, such that only targets which are passed through each of said first and second clutter rejection bandwidths and reported as "target present" conditions by both canceller circuits indicate the radar processor "target detected" condition;

whereby said radar processor achieves the wider-band clutter rejection capability of the first canceller circuit for first range interval clutter and the narrower-band clutter rejection capability of the second canceller circuit for up to the (m+1)th range interval clutter while requiring only n transmitted pulses.

5. The radar processor of claim 4 wherein the index value m equals one, and the (m+1)th range interval is the second range interval.

6. The radar processor of claim 5 wherein said first canceller circuit comprises a double canceller circuit and said second canceller circuit comprises a single canceller circuit.

7. A Moving Target Indicator (MTI) radar processor for processing the radar return signals resulting from n radar pulses transmitted at a constant pulse repetition rate (PRF) and detecting moving targets while rejecting clutter in the second range interval with fewer transmitted fill pulses:

a first canceller circuit for receiving said radar return signals, said circuit comprising an n-tap transversal filter means for providing a first clutter cancellation null response, the respective taps being coupled by respective delay devices for providing a 1/PRF delay, means for weighting the signals at the respective taps in accordance with n respective weights and means for summing the respective weighted tap signals during the 1/PRF time interval following the nth transmitted pulse to provide a first canceller output indicative of a particular target detection condition, including the "target detected" condition and of the "no target detected" condition;

a second canceller circuit for receiving said radar returns, said circuit comprising an n−1 tap transversal filter means for providing a second clutter cancellation null response, the respective taps being coupled by respective 1/PRF delay device means, means for weighting the signals at the respective taps in accordance with n−1 respective weights and summing the respective weighted tap signals during said 1/PRF time interval to provide a second canceller output indicative of a particular target detection condition, including the "target detected" and "no target detected" conditions;

wherein said n-tap filter means of said first canceller circuit provides increased degrees of freedom for defining said first null response over the degrees of freedom provided by said n−1 tap filter means of said second filter means in defining said second null response; and "AND" circuit for processing said first and second output signals and providing a radar processor output signal during said 1/PRF interval indicative of a radar "target detected" condition only if each of said first and second canceller output signals also indicates the "target detected" condition;

whereby said radar processor provides the clutter rejection response of the first canceller for first range interval clutter and the clutter rejection response of the second canceller circuit for second range interval clutter while requiring only n transmitted pulses.

8. A multiple range interval cancellation circuit for Moving Target Indicator (MTI) radars employing a plurality of radar pulses transmitted at a constant pulse repetition rate (PRF), comprising:

a first clutter canceller comprising an n-tap doppler filter set and target detection circuitry for providing a first canceller signal indicative of a particular target detection condition, including the "no target detected" or "target detected" conditions, within one of the range interval cells corresponding to one of said doppler filters, said n-tap doppler filters providing respective first clutter rejection null response;

a second clutter canceller comprising an n−1 tap filter set and target detection circuitry for providing a second canceller circuit indicative of a particular target detection condition, including the "no target detected" or "target detected" conditions, within one of the range interval cells corresponding to one of said doppler filters, said n−1 tap doppler filters providing respective second clutter rejection null responses; and output circuit means for processing said first and second output signals to provide a processor output signal indicative of the processor "target detected" condition only if each of said first and second canceller output signals also indicate the "target detected" condition.

9. The radar processor of claim 8 wherein said first and second canceller output signals are binary-leveled signals wherein the low state represents the "no target detected" condition and the high state represents the "target detected" condition, and wherein said output circuit means comprises an AND logic gate.

* * * * *